(12) United States Patent
Judge

(10) Patent No.: US 11,373,184 B2
(45) Date of Patent: Jun. 28, 2022

(54) SYSTEMS AND METHODS FOR FACILITATING NETWORK REQUESTS

(71) Applicant: MASTERCARD INTERNATIONAL INCORPORATED, Purchase, NY (US)

(72) Inventor: Edward William Judge, Fleet (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 784 days.

(21) Appl. No.: 15/851,083

(22) Filed: Dec. 21, 2017

(65) Prior Publication Data

US 2019/0197536 A1 Jun. 27, 2019

(51) Int. Cl.
*G06Q 20/28* (2012.01)
*G06Q 20/40* (2012.01)
(Continued)

(52) U.S. Cl.
CPC ......... *G06Q 20/401* (2013.01); *G06Q 20/027* (2013.01); *G06Q 20/045* (2013.01);
(Continued)

(58) Field of Classification Search
CPC .... G06Q 20/16; G06Q 20/045; G06Q 20/401; G06Q 20/027; G06Q 20/0855;
(Continued)

(56) References Cited

U.S. PATENT DOCUMENTS 5,944,784 A * 8/1999 Simonoff ................ G06F 9/545
709/202
6,085,976 A 7/2000 Sehr
(Continued)

FOREIGN PATENT DOCUMENTS

CA 2435909 C * 8/2020 ............. G06Q 20/02
KR 20100054835 A * 5/2010 .......... H04W 12/062
(Continued)

OTHER PUBLICATIONS

Michael Z. Lee, Alan M. Dunn, Jonathan Katz, Brent Waters, and Emmett Witchel; Anon-Pass: Practical Anonymous Subscriptions; May 1, 2014; IEEE, web, 20-27 (Year: 2014).*
(Continued)

*Primary Examiner* — I Jung Liu
(74) *Attorney, Agent, or Firm* — Harness, Dickey & Pierce, P.L.C.

(57) ABSTRACT

Systems and methods are provided for facilitating network requests regarding transit by users. One exemplary method includes receiving, at a computing device, a network request for a subscription plan from a user and requesting, by the computing device, issuance of a transit account from an issuing entity, whereby, upon issuance of the transit account, a credential associated with the transit account is provisioned to a transit application associated with the user. The exemplary method also includes directing, by the computing device, funds from a common account to the transit account, at the issuing entity, based on the subscription plan, thereby permitting the user to engage in transit services funded by the transit account consistent with the subscription plan at multiple different transit providers.

18 Claims, 3 Drawing Sheets

Figure 1:
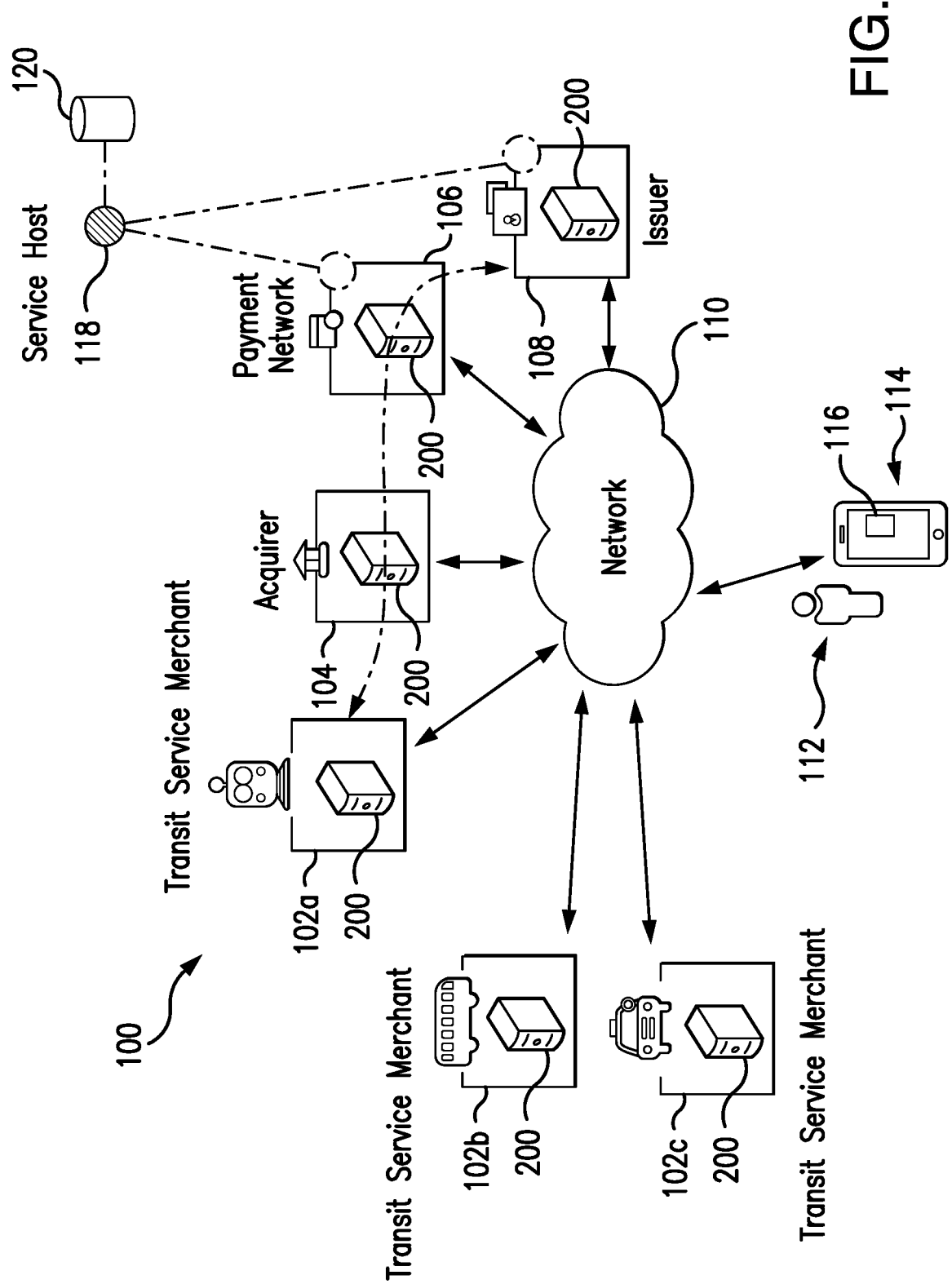

(51) Int. Cl.
   *G06Q 20/08* (2012.01)
   *G06Q 20/14* (2012.01)
   *G06Q 20/04* (2012.01)
   *G06Q 20/02* (2012.01)
   *G06Q 20/10* (2012.01)

(52) U.S. Cl.
   CPC ......... *G06Q 20/0855* (2013.01); *G06Q 20/10* (2013.01); *G06Q 20/14* (2013.01); *G06Q 20/28* (2013.01); *G06Q 20/405* (2013.01)

(58) Field of Classification Search
   CPC ........ G06Q 20/10; G06Q 20/14; G06Q 20/28; G06Q 20/405
   See application file for complete search history.

(56) References Cited

U.S. PATENT DOCUMENTS

| | | | |
|---|---|---|---|
| 7,527,208 B2 | 5/2009 | Hammad et al. | |
| 8,942,677 B2 | 1/2015 | Dixon et al. | |
| 2001/0018739 A1* | 8/2001 | Anderson | G06Q 10/10 380/243 |
| 2007/0233615 A1* | 10/2007 | Tumminaro | G06Q 20/12 705/75 |
| 2008/0014908 A1 | 1/2008 | Vasant | |
| 2009/0239512 A1 | 9/2009 | Hammad et al. | |
| 2011/0213684 A1 | 9/2011 | Tait | |
| 2016/0086160 A1 | 3/2016 | Desai et al. | |
| 2020/0387901 A1 | 12/2020 | Kellett et al. | |

FOREIGN PATENT DOCUMENTS

| | | |
|---|---|---|
| WO | WO2018/005635 | 1/2018 |
| WO | WO2018/005636 | 1/2018 |

OTHER PUBLICATIONS

The Economist, "Transport as a service, It starts with a single app"; https://www.economist.com/news/international/21707952-combining-old-and-new-ways-getting-around-will-transform-transportand-cities-too-it; Sep. 29, 2016; 10 pgs.

\* cited by examiner

SYSTEMS AND METHODS FOR FACILITATING NETWORK REQUESTS

FIELD

The present disclosure generally relates to systems and method for use in facilitating network requests with regard to transit.

BACKGROUND

This section provides background information related to the present disclosure which is not necessarily prior art.

Different transit options are often offered in a variety of city, suburban, or rural settings, including subways, busses, taxi cabs, ferries, etc. For use of the transit, individuals typically purchase paper tickets, or passes, for the transit. More recently, the paper tickets or passes have been supplanted with mobile versions thereof, in which unified gateways are provided through which transit may be purchased. For example, a monthly subscription service may provide an individual with access to one or more public transit services, where the individual is able to use the service for a specific duration, a specific numbers of "rides," or a specific distance, where the cost of the monthly subscription provides for the rides or the distance. In order to provide this access for multiple different types of transit, a host of the subscription service is required to interact and contract with each of the different desired transit services to be used by the individual, whereby the transit services will then permit the individual to ride and the host will arrange for payment to the different transit services. With that said, as the geographic region of the transit services grows, the host of the subscription service engages additional transit services to permit individuals to use transit through the geographic region.

DRAWINGS

The drawings described herein are for illustrative purposes only of selected embodiments and not all possible implementations, and are not intended to limit the scope of the present disclosure.

Figure 2:
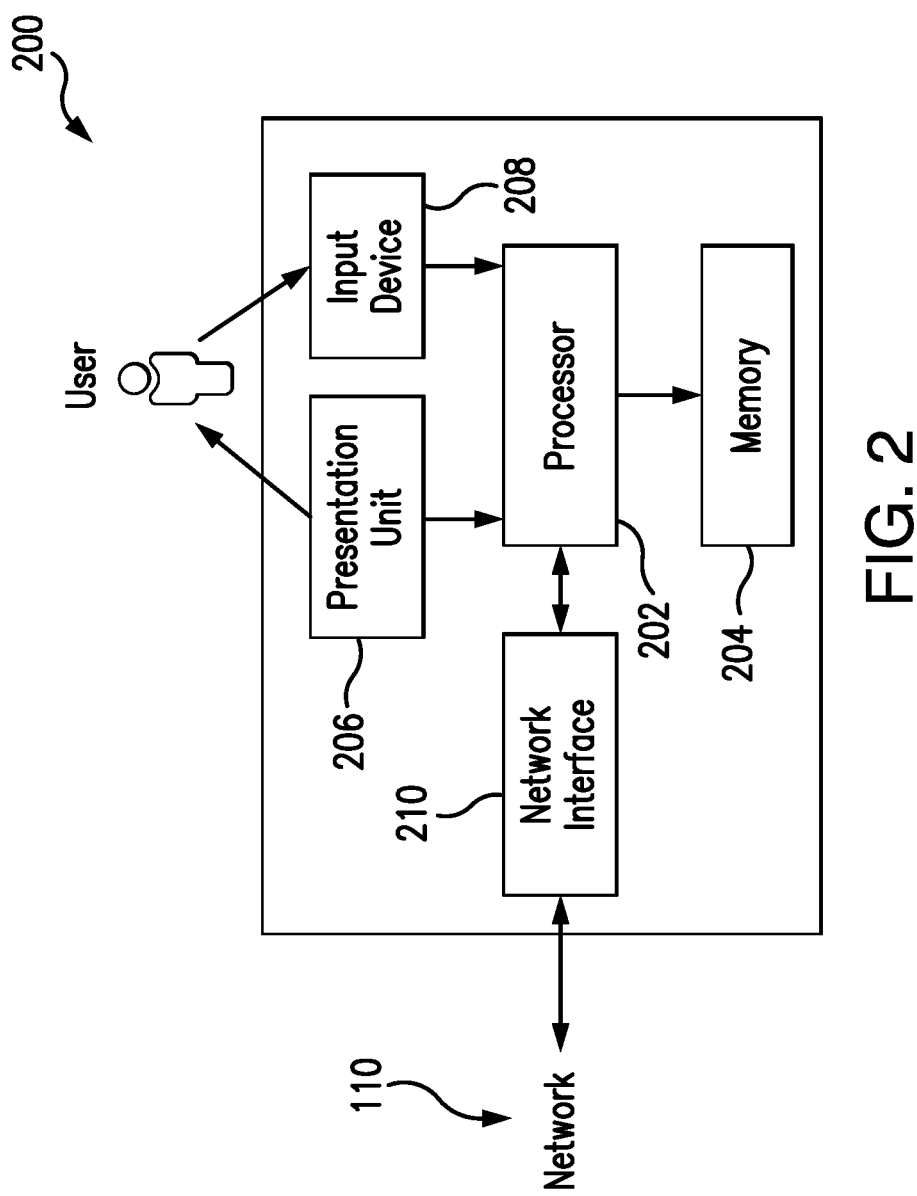
Figure 3:
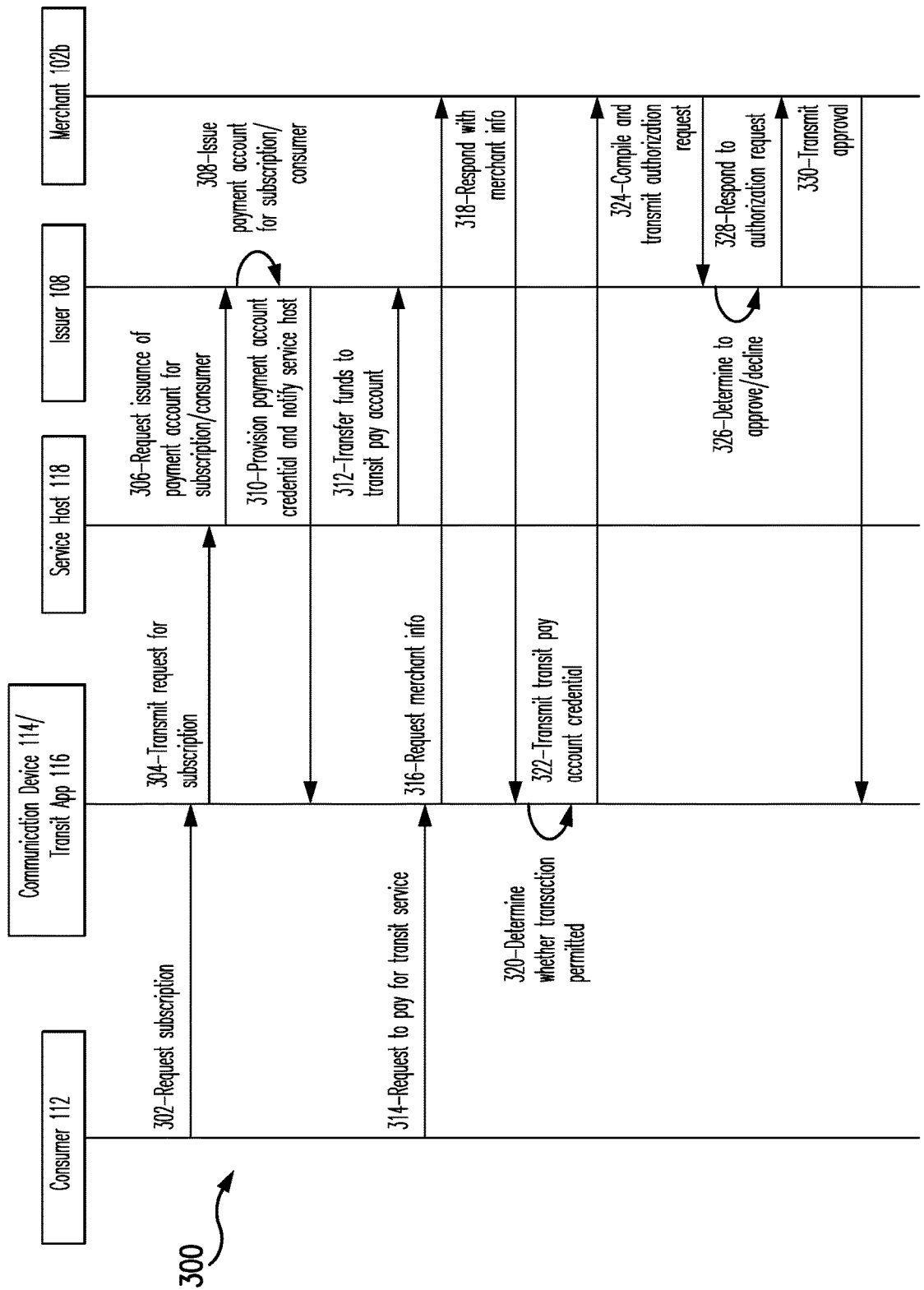

FIG. 1 illustrates an exemplary system of the present disclosure suitable for use in facilitating network transactions between consumers and transit service providers, through a common account, whereby transit services are then provided to the consumers by different ones of the transit service providers;

FIG. 2 is a block diagram of a computing device that may be used in the exemplary system of FIG. 1; and FIG. 3 is an exemplary method for facilitating network transactions between a consumer and one or more of multiple different transit service providers, through use of a common account, whereby the consumer is then able to use transit provided by the one or more of the multiple different transit service providers, and which may be implemented in the system of FIG. 1.

Corresponding reference numerals indicate corresponding parts throughout the several views of the drawings.

DETAILED DESCRIPTION

The description and specific examples included herein are intended for purposes of illustration only and are not intended to limit the scope of the present disclosure.

Consumers pay for transit services in a variety of different manners. In connection therewith, when "mobility as a service," or MaaS, arrangements are provided by service hosts to the consumers, the hosts are required to individually interact with each of multiple different transit service providers to determine applicable terms and/or conditions of the hosts providing the consumers with access to the given transit (as provided by the different transit providers). As such, depending on the geographic region of the transit, the hosts may be challenged to contract with a large number of transit service providers to make the MaaS arrangements appealing to the consumers, and/or may be limited to the specific regions in which the hosts are present and/or the consumers reside.

Uniquely, the systems and methods herein provide for use of a common account by a consumer, as implemented by a service host, to pay for transit offered by different transit service providers (or transit service merchants). In so doing, the consumer is able to direct a subscription payment to the service host for the transit (and for use of the account), even in the absence of contract(s) between the service host and the providers. In particular, the service host is configured to issue a payment account for the consumer, which is specific to the consumer. The payment account is funded, by the service host, at one or more intervals based on a subscription type of the consumer. Then, when the consumer attempts to transact with a transit service provider, a mobile application at a communication device associated with the consumer is able to check a parameter of the transit service provider (e.g., a merchant category code (MCC), etc.), and to provide a credential associated with the payment account of the consumer to the transit service provider when the parameter is configured. In turn, the transit service provider initiates a payment account transaction for the interaction, as is conventional, whereby payment is received for the transit service via the payment account. In this manner, the service host leverages an unconventional payment account setup to fund the consumer's transit, whereby the payment account is controlled by the service host yet utilized by the consumer. The consumer is thus able to participate in the transit services provided by the host, by paying the subscription fees (e.g., monthly, or through other payment intervals and/or types of payments, etc.), still leaving the details of the interaction to the service host, while the service host is not obligated to make special arrangements with each of the different transit service providers as is typically required.

FIG. 1 illustrates an exemplary system 100, in which one or more aspects of the present disclosure may be implemented. Although the system 100 is presented in one arrangement, other embodiments may include systems arranged otherwise depending, for example, on travel options, transit options, accessibility of transit data, accessibility of user data, processing of purchase options for travel, etc.

The system 100 generally relates to travel and includes three transit service merchants 102a-c, an acquirer 104 associated with accounts for each of the transit service merchants 102a-c, a payment network 106, and an issuer 108, each of which is coupled to network 110. The network 110 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, network 110 may include multiple different networks, such as a private payment transaction network made accessible by the payment network 106 to the acquirer 104 and the issuer 108 and, separately, the public Internet, which is accessible as desired to the merchants 102a-c, the acquirer 104, the payment network 106, the issuer 108, and a consumer 112 (and more specifically, a communication device 114 associated with the consumer 112).

Each of the transit service merchants 102a-c is generally associated with travel services, and transport of persons from one location to another. In this exemplary embodiment, the transit service merchant 102a is associated with rail travel (e.g., travel by train, subway, tram, streetcar, trolley, metro, etc.) in one or more regions. The transit service merchant 102b is associated with bus travel. And, the transit service merchant 102c is associated with private travel (e.g., travel by taxi, ride service (e.g., Uber™ service, Lyft™ service, etc.), etc.). In general, the transit service merchants 102a-c offer transit to users in exchange for a fee, charge, and/or fare. For example, the transit service merchant 102a conventionally offers for sale and sells train passes, to users, per ride, for multiple rides, per duration (e.g., weekly pass, monthly pass, etc.), and/or for unlimited rides, etc. The train passes permit the purchasing users to travel in train(s) associated with the transit service merchant 102a, as the train(s) travel from station to station. Similarly, for example, the transit service merchants 102b and 102c conventionally offer fairs, passes, fees per ride, etc., whereby the users pay and the transit service merchants 102b-c provide travel to the users from one location to another.

It should be appreciated that while only three transit service merchants 102a-c are shown in FIG. 1, a different number of transit service merchants and/or different types of transit service merchants may be included in other system embodiments. Other types of transit service merchants may include, for example, boat or ferry operators, airplane pilots/services, helicopter pilots/services, charter services, etc.

In this exemplary embodiment, the system 100 includes the consumer 112 as a potential user of the transit offered by the different transit service merchants 102a-c. The consumer 112 is associated with a communication device 114. In this exemplary embodiment, the communication device 114 includes a portable communication device, such as, for example, a smartphone, a tablet, or a wearable device (e.g., an Apple Watch® wearable device, etc.), etc. The communication device 114 includes a network-based application, which is referred to herein as a transit application (or transit app) 116. And, the transit app 116 is provided to configure the communication device 114 to operate as described herein. That said, the transit app 116 may be a standalone application within the communication device 114, or it may be incorporated into another network-based application such as, for example, a virtual wallet at the communication device 114 (e.g., via a software-development kit (SDK), etc.), etc.

It should be appreciated that the acquirer 104 and the issuer 108 in the system 100 generally include one or more banking institutions, etc., and operate in connection with processing payment account transactions, generally, as is conventional. That said, while only one acquirer 104, one payment network 106, one issuer 108, one consumer 112, and one communication device 114 are illustrated in FIG. 1, it should be appreciated that a different number of these entities and devices (and their associated components) may be included in the system 100, or may be included as a part of systems in other embodiments, consistent with the present disclosure.

FIG. 2 illustrates an exemplary computing device 200 that can be used in the system 100. The computing device 200 may include, for example, one or more servers, workstations, personal computers, laptops, tablets, smartphones, PDAs, etc. In addition, the computing device 200 may include a single computing device, or it may include multiple computing devices located in close proximity or distributed over a geographic region, so long as the computing devices are specifically configured to function as described herein. In the exemplary embodiment of FIG. 1, each of the transit service merchants 102a-c, the acquirer 104, the payment network 106, and the issuer 108 are illustrated as including, or being implemented in, computing device 200, coupled to the network 110. For example, the computing devices 200 of the transit merchants 102a-c may include, without limitation, one or more point of sale (POS) terminals configured to initiate payment account transactions based on, for example, payment account credentials, etc. provided in exchange for transit services rendered, where the POS devices are then consistent with computing device 200. In addition, the communication device 114 associated with the consumer 112 may be considered a computing device consistent with computing device 200. With that said, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to the processor 202. The processor 202 may include one or more processing units (e.g., in a multi-core configuration, etc.). For example, the processor 202 may include, without limitation, one or more processing units (e.g., in a multi-core configuration, etc.), including a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, transit data, subscription types and/or statuses, payment account credentials, and/or other types of data suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 that is operating as described herein. It should be appreciated that the memory 204 may include a variety of different memories, each implemented in one or more of the functions or processes described herein.

In the exemplary embodiment, the computing device 200 includes a presentation unit 206 that is coupled to the processor 202 (however, it should be appreciated that the computing device 200 could include output devices other than the presentation unit 206, etc.). The presentation unit 206 outputs information (e.g., subscription status, subscription options, transit options and/or histories, etc.), either visually or audibly to a user of the computing device 200, for example, the consumer 112, etc. It should be further appreciated that various interfaces (as described herein) may be displayed at computing device 200, and in particular at presentation unit 206, to display such information. The presentation unit 206 may include, without limitation, a liquid crystal display (LCD), a light-emitting diode (LED) display, an organic LED (OLED) display, an "electronic ink" display, speakers, etc. In some embodiments, presentation unit 206 may include multiple devices.

The computing device 200 also includes an input device 208 that receives inputs from the user (i.e., user inputs) such as, for example, selections of transit, selections of associated users, instructions to pay the transit service merchants 102a-c, etc. The input device 208 is coupled to the processor 202 and may include, for example, a keyboard, a pointing device, a touch sensitive panel (e.g., a touch pad or a touch screen, etc.), another computing device, and/or an audio input device. Further, in various exemplary embodiments, a touch screen, such as that included in a tablet, a smartphone, or similar device, may behave as both the presentation unit 206 and the input device 208.

In addition, the illustrated computing device 200 also includes a network interface 210 coupled to the processor 202 and the memory 204. The network interface 210 may include, without limitation, a wired network adapter, a wireless network adapter, a mobile network adapter (e.g., an NFC adapter, a Bluetooth adapter, etc.), or other device capable of communicating to one or more different networks, including the network 110. Further, in some exemplary embodiments, the computing device 200 may include the processor 202 and one or more network interfaces incorporated into or with the processor 202.

Referring again to FIG. 1, the system 100 includes a service host 118, which is configured, by executable instructions, generally, to interact with the transit app 116 (e.g., at the communication device 114, etc.) and to otherwise operate as described herein. The service host 118 is shown in FIG. 1 as a standalone part of the system 100, and is generally consistent with computing device 200. Alternatively, and as indicated by the dotted lines in FIG. 1, the service host 118 may be incorporated, in whole or in part, into the payment network 106 and/or issuer 108. In addition, the service host 118 is coupled to a transit data structure 120, which may be standalone from the service host 118 or, as indicated by the dotted line, may be incorporated in whole, or in part, with the service host 118. The data structure 120 includes consumer profiles, subscription plans, etc. as will be described herein.

In this exemplary embodiment, the service host 118 is associated with an account for use as described herein (and referred to herein as a common account). The common account may be issued by the issuer 108, or by another banking institution, or otherwise, and is associated with and/or incorporated with the service host 118 (although this is not required in all embodiments). Similarly, the consumer 112 is associated with an account (referred to herein as a funding account), from which funds may be deducted and/or transferred consistent with the description herein (e.g., in connection with payment account transactions or other transactions by the consumer 112, etc.). The funding account, like the common account, may be issued by the issuer 108 or another banking institution, or otherwise.

When the consumer 112 determines to subscribe with the service host 118 for provision of transit (as described herein), the consumer 112 accesses the transit app 116 at the communication device 114 (or, as needed, initially installs the transit app 116 and then accesses it). In response, the communication device 114, as configured by the transit app 116, interacts with the service host 118 (e.g., via network 110, etc.). In particular, for example, the communication device 114, as configured by the transit app 116, may retrieve one or more subscription plans from the service host 118 (as stored in the data structure 120) or receive the one or more subscription plans from the service host 118, and display one or more interfaces to the consumer 112, which lists and/or explains the one of more subscription plans. In connection therewith, and as generally described herein, the consumer 112 has a commercial relationship with the service host 118 (or the entity operating the service host 118). Without limitation, several exemplary subscription plans are illustrated in Table 1.

TABLE 1

| Subscription Plan | Plan Inclusions | Cost |
| --- | --- | --- |
| #1 | 15 bus rides<br>10 train rides | $15/week |
| #2 | 8 bus rides<br>12 train rides<br>15.0 miles taxi | $45/month |
| #3 | 24 bus rides<br>6.0 miles taxi<br>1 day light van use | $60/week |
| #4 | 10 train rides<br>5 days bike-share scheme use<br>10.0 miles taxi | $30/week |
| #5 | Unlimited bus<br>Unlimited train<br>2 days sports car use | $100/week |

As shown, the subscription plan #1, for example, includes a mix of bus rides and train rides and a cost per week, while subscription plan #2 includes a mix of bus, train and taxi rides, and a cost per month. In addition, the subscription plan #3 includes bus rides and taxi rides as well as a light van use. And, subscription plans #4 and #5 similarly include different mixes of transit. As can be appreciated, the service host 118 may offer such different subscription plans (and others) to consumers (including the consumer 112), each with different mixes of transit, in attempt to accommodate and/or appeal to the different needs and/or desires of the consumers (e.g., city commuters may desire train rides and bike share transit; tradesmen may desire bus rides and occasional van use transit; affluent consumers may desire taxis, trains, and occasional sports car use; etc.). It should thus be appreciated that the particular subscription plans identified for the consumer 112 in Table 1 may be different in other embodiments, and may have different inclusions by different transit service providers (merchants) in other embodiments. For example, the plans may include different intervals, such as, for example, two weeks, monthly, bi-monthly, quarterly, semi-annually, annually, etc. In addition, the plans may further include different combinations of rides/services at different transit service merchants. For example, one subscription may be limited to train-type transit service merchants (like, the merchant 102a), while other plans may include different types of transits services (such as subscription plans #1 and #2 in Table 1). In general, the consumer 112 is able to select, via the transit app 116 and/or the services host 118, a plan to which to subscribe which best fits the needs of the consumer 112.

What's more, while each of the subscription plans described herein is stored in the data structure 120, all or less than all of the subscription plans may be provided by the service host 118 to the communication device 114. For example, the service host 118 may be configured to provide only certain subscription plans to the transit app 116, based on one or more parameters associated with the consumer 112 and/or of the transit desired by the consumer 112, etc. (e.g., location, expressed interest, etc.). Conversely, the communication device 114, as configured by the transit app 116, may retrieve only certain subscription plans from the service host 118, again, based on one or more parameters as described above. In still other embodiments, the communication device 114 may be configured to retrieve and/or the service host 118 may be configured to provide all available subscription plans, whereby the consumer 112 may view the plans and select one or more desired plans.

Thereafter in the system 100, the consumer 112 may select one of the subscription plans in order to subscribe thereto. Prior to, or after such selection, the communication device 114, as configured by the transit app 116, may solicit certain consumer information from the consumer 112, such as, without limitation, name, address, phone number, and details of the funding account (e.g., primary account number (PAN), expiration date, card verification code (CVC), etc.), etc. Upon receipt of the consumer information, the communication device 114, as configured by the transit app 116, transmits a subscription request to the service host 118, which includes, in this embodiment, the received consumer information and the consumer's selection of one or more of the given subscription plans.

The service host 118, in turn, is configured to compile and store a consumer profile for the consumer 112 in the data structure 120 (e.g., based on the consumer information solicited by the communication device 114 and/or transit app 116, etc.). Further, the service host 118 is configured to transmit a request to the issuer 108, to issue a transit pay account for the consumer 112. In response, the issuer 108 is configured to issue the transit pay account and to identify the transit pay account to the service host 118 (whereby the transit pay account is generally maintained by the issuer 108 for the consumer 112, but without the consumer 112 having separate access and/or control thereto). The transit pay account, again, is generally specific to the consumer 112, and thus, not generally usable by other consumers. Once issued, the service host 118 is configured to add one or more identifiers, credentials, etc. of the transit pay account (e.g., a PAN, etc.) to the consumer profile in the data structure 120. The issuer 108 is configured to then provision a credential for the transit pay account to the transit app 116, in the communication device 114 (whereby the transit app 116 may operate as a payment application with regard to the transit pay account, etc.). In connection therewith, the transit app 116 is configured to securely store the payment credential for the for the transit pay account associated with the consumer 112 by the service host 118. For example, the issuer 108 may provision a credential for the consumer's transit pay account to the transit app 116 over network 110 (e.g., via a connection maintained by the communication device 114 through the network 110, etc.). In connection therewith, the credential may include a token representative of the consumer's account, where the token may be created and provisioned by a service such as the Mastercard Digital Enablement Service (MDES). Upon receipt of the credential, the transit app 116 may then store the credential securely within the app 116 and enable its use to make payments via the communication device 114 (e.g., via NFC or Bluetooth payment capabilities of the communications device 114, etc.) that are funded via the transit pay account.

In the consumer profile for the consumer 112, or more generally, in the data structure 120, the service host 118 is configured to compile rules for the consumer 112 for use of the transit pay account (generally independent of any input from the consumer 112, i.e., the consumer 112 does not contribute to and/or choose the rules and/or the content of the rules (e.g., the service host 118 generates and/or identifies the rules free of any input from the consumer 112)). The rules may include, for example, a subscription fee date for the selected subscription plan, upon which a recurring payment is initiated (in a conventional manner) from the consumer's funding account to the common account whereby the consumer 112 pays for the selected subscription plan (e.g., a recurring payment of $45 per month, on the $10^{th}$ of the month, for selection of subscription plan #2 in Table 1; etc.). In addition, the rules may include replenishment instructions for the transit pay account, which may indicate intervals of fund transfers and/or thresholds for such transfers of funds (from the common account to the consumer's transit pay account). For example, the rules may require a transfer of $12.50 every Monday at 10:00 am, or more generally a transfer of $17.50 when the balance in the transit pay account falls below a $15.00 threshold. Or, as another example, the rules may require the transit pay account have a minimum balance that is enough to cover up to a day's worth of rides (e.g., $50, etc.), and to replenish the account (e.g., overnight, etc.) when needed.

Then, upon initiation of the consumer's subscription with the service host 118 and consistent with the rules, the service host 118 is configured to direct at least an initial transfer of funds, from the common account, for example, to the consumer's transit pay account (in a generally conventional manner). Thereafter, the service host 118 is configured to direct one or more additional transfers of funds, from the common account, for example, to the transit pay account, as indicated by the subscription plan and/or rules included in the consumer profile for the consumer 112 (again in a generally conventional manner).

Also upon initiation of the consumer's subscription with the service host 118, the service host 118 is configured to confirm the selected subscription plan(s) with the consumer 112 at the transit app 116. And, the communication device 114, as configured by the transit app 116, is configured to interact with the consumer 112 and the service host 118 to provide the subscription plan details to the consumer 112, as well as transaction histories, etc.

Later, when the consumer 112 desires to use transit from one or more of the transit service merchants 102a-c, and attempts such transit, the consumer 112 accesses the transit app 116. In turn, the communication device 114, as configured by the transit app 116, cooperates with and/or communicates with the computing device 200 at the given transit service merchant 102a, for example, to facilitate the transit. Specifically, the communication device 114, as configured by the transit app 116, solicits merchant information from the computing device 200 for the transit service merchant 102a. The merchant information may include the merchant category code (MCC) for the transit service merchant 102a, or other information indicative thereof. The computing device 200 is configured to respond with the merchant information, and then, the communication device 114, as configured by the transit app 116, verifies the merchant information either locally, based on, for example, a comparison of the MCC for the transit service merchant 102a to a listing of permitted MCCs stored therein. For example, a listing of MCCs associated with transit service merchants (in general) may be included in the communication device 114 (via the transit app 116) as permitted MCCs, such that an MCC for a restaurant merchant would be not verified (e.g., if the consumer 112 attempted to use the transit pay account at a restaurant, etc.), while an MCC for a bus line would be verified. In this manner, the system 100 inhibits transactions from being funded by the transit pay account, unless they involve a transit service merchant. What's more, in some embodiments, the permitted MCCs may be particularly limited to the specific transit merchants included in the subscription plan selected by the consumer 112 (as opposed to simply including MCCs generic to transit).

While, in the illustrated embodiment, the merchant information received from the transit service merchant 102*a* may be verified locally at the communication device 114. In other embodiments, the communication device 114, as configured by the transit app 116, may instead provide the received merchant information to the service host 118 and, in turn, the service host 118 may be configured to verify the merchant information against permitted merchant information, for example, in the data structure 120, and to confirm verification thereof back to the transit app 116.

In any case, once the merchant information for the transit service merchant 102*a* is verified, the communication device 114, as configured by the transit app 116, passes the payment credential associated with the consumer's transit pay account, as provisioned thereto by the issuer 108, to the transit service merchant 102*a*. And, the transit service merchant 102*a* is configured to initiate a payment account transaction for the desired transit, by compiling and transmitting an authorization request to the issuer 108, via the acquirer 104 and the payment network 106, as is conventional (and as indicated by the dotted line in FIG. 1). The issuer 108 is then configured to approve, or decline, the transaction and to generate and transmit an authorization reply to the transit service merchant 102*a*. If approved, the consumer 112 is permitted entry and to proceed with the desired transit. If not (e.g., if the transit pay account has insufficient funds, etc.), the consumer 112 is not permitted entry and/or the transit is not provided to the consumer 112.

In the above example, the transit service merchant 102*a* may be an out-of-scheme merchant such that the service host 118 does not have a direct contract with the transit service merchant 102*a*. However, as described, the consumer 112 is still able to use funds associated with the transit pay account to pay for transit provided by the transit service merchant 102*a*. The communication device 114, via the transit app 116, simply functions as a payment device/application, drawing down some of the funds already held by the service host 118 at the transit pay account for the consumer 112. Alternatively, for interactions by the consumer 112 at transit service merchants that are in-scheme merchants (where the service host 118 has a direct contract for providing transit to consumers associated with the service host), the service host 118 may pay the in-scheme merchants for transit rendered in a conventional B2B (business-to-business) fashion (e.g., from the service host's common account, etc.) under the terms of the direct contracts that they have with the service host 118 (e.g., in the form of a monthly or biannual settlement of charges, etc.). Thus, as can be appreciated herein, the service host 118 facilities transit, through use of the transit pay account, not only with in-scheme transit service merchants but also with out-of-scheme transit service merchants.

FIG. 3 illustrates an exemplary method 300 for facilitating purchase of transit. The exemplary method 300 is described with reference to FIG. 1 as implemented in the transit app 116 and the service host 118, and also with reference to the computing device 200. However, it should be understood that the methods herein are not limited to the exemplary system 100 or the exemplary computing device 200. Likewise, the systems and the computing devices herein should not be understood to be limited to the exemplary method 300.

At the outset in the method 300, the consumer 112 is generally registered to the service host 118 and has the transit app 116 installed to his/her communication device 114. As such, the consumer 112 initially activates the transit app 116 and requests, at 302, a subscription with the service host 118 for use in purchasing travel through one or more of the transit service merchants 102*a-c*. In turn, the transit app 116 receives the request and transmits, at 304, the request to the service host 118. The request may include, for example, a selection of a particular subscription plan, personal identifying information for the consumer 112 (e.g., name, address, phone number, etc.), and, potentially, account information associated with the consumer's funding account (issued to the consumer 112 by the issuer 108) for funding the subscription with the service host 118. The selected subscription plan may include, without limitation, a particular term and/or a particular number of transit services (e.g., as illustrated above in Table 1, etc.). For example, the selected subscription plan may include plan #2 of Table 1, which includes a monthly subscription, and twelve train rides via the transit service merchant 102*a* (or other train-type service provider), fifteen miles of taxi service from the transit service merchant 102*c* (or other similar private transit service provider), and eight bus rides from the transit service merchant 102*b* (or other similar bus-type transit service provider), etc.

Upon receipt of the subscription request from the consumer 112, the service host 118 stores at least a portion of the content of the request in a profile associated with the consumer 112 (which may include generating the profile for the consumer 112 if not already done). Specifically, for example, the service host 118 stores the name, address, and phone number for the consumer 112, the account credential for the consumer's funding account, and the selected subscription plan in the consumer profile in the data structure 120. The service host 118 further generates and/or identifies rules for the consumer 112, based on the plan selected by the consumer 112, and stores the rules in the consumer profile. As discussed above in the system 100, the rules may define a replenishment schedule for the selected subscription plan, etc. (e.g., where such schedule is generated free of any input from the consumer 112, etc.)

In connection therewith, the service host 118 also requests issuance, at 306, of a payment account, from the issuer 108, for the subscription and/or consumer 112 (i.e., the transit pay account) (e.g., independent of any particular request by the consumer 112, and without input from the consumer 112 and without the consumer 112 needing to make a particular request, to the issuer 108; etc.). The transit pay account is associated with the consumer 112 (e.g., such that the transit pay account is only available for use by the consumer 112 for transit, etc.) and intended to fund payment account transactions for transit services provided to the consumer 112 (e.g., in connection with the consumer's selected transit plan, etc.). The issuer 108, in turn, then issues the transit pay account for the subscription and/or the consumer 112, at 308. The transit pay account, in this exemplary embodiment, includes a prepaid account, but may be a debit account and/or a credit account in other embodiments. In general, the consumer 112 does not know the transit pay account exists.

Once the transit pay account is issued for the consumer 112 and/or the consumer's selected subscription, the issuer 108 provisions, at 310, one or more credentials for the transit pay account to the communication device 114 associated with the consumer 112 (e.g., to the transit app 116 and/or a corresponding virtual wallet, etc.). In addition, when the transit pay account is issued, the service host 118 is notified of the account (e.g., by the issuer 108, the transit app 116, etc.), for example, by payment account number (e.g., primary account number (PAN), etc.) and consumer name and/or identifier. The service host 118 then stores the account number for the transit pay account in the consumer profile in the data structure 120. Then, the service host 118 transfers funds, at 312, to the transit pay account from the common account (e.g., at the issuer 108 of the transit pay account, etc.), as indicated by the replenishment schedule for the selected subscription plan (e.g., as an initial transfer to the transit pay account, as a replenishment of funds to the transit pay account, etc.). In connection therewith, the replenishment schedule may indicate a weekly transfer, a bi-weekly transfer, a monthly transfer, or another transfer according to one or more other intervals. In addition, the replenishment schedule may include and/or may be based on a threshold amount, such that the transfer is initiated when the balance of the transit pay account falls below threshold value (e.g., $100.00, $25.00, or some other threshold value; etc.). As such, the transit pay account is funded for use by the consumer 112, by the common account, to purchase transit services in accordance with the subscription plan selected by the consumer.

Also in the method 300, at about the same time the consumer 112 selects the desired subscription plan (or otherwise), the service host 118 initiates a payment account transaction for the subscription plan (and the corresponding subscription fee), to be funded by the consumer's funding account (as identified in the consumer profile for the consumer 112 in the data structure 120). For example, when the plan is a monthly payment plan, the service host 118 may initiate a first payment account transaction upon selection of the plan, funded by the funding account, and then schedule multiple recurring transactions consistent with the subscription aspect of the plan (e.g., on the fifteenth of each month (for as long as the consumer 112 is still subscribed to the plan and/or the service host 118), etc.). Such transaction(s) are generally conventional in nature, whereby the consumer 112 then has a commercial relationship with the service host 118 and the funding transaction(s) may be any conventional transaction between the consumer 112 (and his/her funding account) and the service host 118 (and its common account) (e.g., direct debit, ACH, e-commerce "card on file", etc.). It should be appreciated that the subscription fee associated with the given plan may be collected by the service host 118, in this manner, as indicated by the plan selected by the consumer, and deposited in the common account associated with the service host 118.

Thereafter in the method 300, the consumer 112 may interact with one or more of the transit service merchants 102a-c when desired to travel from one location to another. Upon entry and/or approaching a bus, a taxi cab, etc. associated with one of the transit service merchants 102a-c, for example, the transit service merchant 102b, the consumer 112 requests to pay for transit services associated therewith, at 314, via the transit app 116 (or, alternatively, via a virtual wallet including the transit app 116, etc.). The consumer 112 may do so by launching the transit app 116 at the communication device 114, by selecting to pay for the transit service within the transit app 116, by tapping a POS device associated with the merchant 102b, for example, or otherwise (e.g., installed in a platform gate-line array or at a boarding door on a bus, etc.). When the POS device is used to facilitate the transaction, the transit app 116 interacts with the POS device by requesting merchant information for the particular transit service merchant 102b (in this example), at 316. The transit app 116 may request a merchant ID for the transit service merchant 102a, an MCC, a DBA name, a merchant address, or other information that is indicative of the merchant 102b. In response, in this exemplary embodiment, the merchant 102a responds, at 318, to the transit app 116 (via the POS device in this example) with the merchant information (e.g., the MCC for the merchant 102b, or MCC 4131 (bus lines); etc.). It should be appreciated that the merchant 102b, or other ones of the merchants 102a, 102c, or still other merchants, will respond with whatever information the transit app 116 has requested, whether as one or more different MCCs or merchant IDs, DBA names, merchant addresses, etc.

Next, upon receipt of the merchant information, the transit app 116 determines if the transaction is permitted, at 320, based on the merchant information. Specifically, the transit app 116 determines if the MCC of the transit service merchant 102b, for example, is consistent with the subscription plan for the consumer 112 (and/or the consumer profile, and one or more rules associated therewith; etc.). So, where the subscription plan in this example includes eight bus rides, twelve train rides, and fifteen miles of taxi cab rides (i.e., subscription plan #2 of Table 1), the instant transaction at the transit service merchant 102b would be approved or permitted by the transit app 116, because the MCC 4313 is for bus lines (i.e., a permitted type of transit). As such, based on the permission, the transit app 116 (or associated virtual wallet) transmits, at 322, the transit pay account credential (provisioned thereto) to the POS device of the merchant 102b. Conversely, if the consumer's selected subscription plan allowed only taxi cab rides, the transaction would be declined because the MCC 4131 (for the merchant 102b) is for bus lines.

The merchant 102b then, at 324, compiles an authorization request for the transaction and transmits the authorization request to the issuer 108, via the acquirer 104 associated with the merchant 102b and the payment network 106 (as is generally conventional). Thereafter, the issuer 108 determines, at 326, whether to approve or decline the transaction, for example, based on a balance within the transit pay account. For purposes of illustration, in this example the balance of the transit pay account is sufficient to cover the transaction for the transit service, and thus, the transaction is approved. As such, the issuer 108 responds, at 328, to the authorization request indicating that the transaction is approved. Upon receipt of the approval, the approval is transmitted, by the merchant 102b (e.g., the POS device, etc.), at 330, to the transit app 116, whereby it is displayed to the consumer 112 at the presentation unit 206 of the communication device 114.

While the example transaction is described above as being permitted and approved, this is not required in all embodiments. Specifically, for example, when the transit app 116 requests merchant information from a POS device (in connection with attempting a transaction at a merchant (not shown) using the transit pay account), and the merchant responds with the MCC 5812 (Eating Places and Restaurants), the transaction will not be permitted (by the transit app 116) because the merchant is unrelated to transit. In other words, the transit app 116 generally includes a "white list," in this embodiment, of permitted MCCs. When the MCC returned from the merchant, in connection with an attempted transaction using the transit pay account, is not on that list, the transaction is not permitted, and an error, warning or decline is presented to the consumer 112, at the presentation unit 206 of the communication device 114. Similarly, when the merchant is a transit service merchant, but not one within the subscription plan of the consumer 112, the transaction may likewise not be permitted, and an error, warning or decline presented to the consumer 112, at the presentation unit 206 of the communication device 114.

With that said, in general the service host 118 may be viewed as a mobility or transit merchant that receives a stream of recurring payments (e.g., by direct debit or any other desired transaction, etc.) from the consumer 112, and then funds payment for transit by the consumer 112. The recurring payments to the service host 118, however, are all the consumer 112 sees and/or is aware of in connection with funding transit for his/her selected subscription plan. The consumer 112 is not aware that the transit pay account exists (e.g., such that the account is a hidden virtual prepaid account, etc.) or that the service host 118 replenishes the account as needed (where the replenishment amount/schedule is independent of the recurring payments made by the consumer 112 to the service host 118). In addition, the consumer 112 does not contribute to and/or make decisions regarding replenishment of the transit pay account (and/or other rules relating thereto). The consumer 112 generally only selects the subscription plan such that the only thing the consumer 112 knows about with regard to the desired transit is the monthly subscription to the service host 118. It is then the service host 118 that decides, based upon risk analysis of consumer 112 and/or his/her spending behavior and/or future transport needs, etc., how much to fund to and how often to replenish the transit pay account (and/or to implement other rules for the transit pay account). In other words, the consumer 112 does not both select the subscription plan and the replenishment schedule (or other rules related to the transit pay account).

In connection therewith, the service host 118 may have various direct contracts with in-scheme transport providers (e.g., in-scheme merchants, etc.) and will pay the contracts for services rendered in conventional ways (as opposed to every consumer registered to the service host 118 having contracts with the transport providers). For example, service host 118 may pay the in-scheme transport providers for transport rendered in a conventional B2B fashion under the terms of the direct contracts that they have with the service host 118 (e.g., in the form of a monthly or biannual settlement of charges, etc.). What's more, herein, the consumer 112 is also able to use funds associated with the transit pay account to pay for rides on transport providers outside the scheme (e.g., out-of-scheme merchants, etc.) with whom the service host 118 has no direct contracts. Here, the transit app 116, via the communication device 114, functions as a payment device/application, drawing down some of the funds already held by the service host 118 at the transit pay account for the consumer 112.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving, at a computing device, a request for a subscription plan from a user; (b) requesting, by the computing device, issuance of a transit account from an issuing entity, whereby, upon issuance of the transit account, a credential associated with the transit account is provisioned to a transit application associated with the user; (c) directing, by the computing device, funds from a common account to the transit account, at the issuing entity, based on the subscription plan, thereby permitting the user to engage in transit services funded by the transit account consistent with the subscription plan at multiple different transit providers; (d) initiating a recurring transaction for an amount indicated by the subscription plan, to a funding account associated with the user, at an interval indicated by the subscription plan; (e) determining, by the computing device, when a balance of the transit account is below a defined threshold; (f) directing, by the computing device, additional funds from the common account to the transit account, at the issuing entity, thereby permitting the user to engage in transit services consistent with the subscription plan and funded by the transit account; (g) for a transaction initiated by the user at a merchant using the transit account, determining, by the computing device, whether a merchant category code (MCC) associated with the merchant is associated with a permitted MCC for the transit account; (h) when the MCC associated with the merchant is associated with a permitted MCC for the transit account and when the merchant does not have a direct contract with a transit service host, directing funds from the transit account to the merchant in connection with the transaction initiated by the user at the merchant; (i) for a transaction initiated by the user at a second merchant using the transit account, determining, by the computing device, whether a MCC associated with the second merchant is associated with a permitted MCC for the transit account, the second merchant having a direct contract with the transit service host; and (j) when the MCC associated with the second merchant is associated with a permitted MCC for the transit account, directing funds from the common account to the merchant in connection with the transaction initiated by the user at the second merchant.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," "coupled to," "associated with," included with," or "in communication with" another element or layer, it may be directly on, engaged, connected or coupled to, associated with, or in communication with the other element or layer, or intervening elements or layers may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements/features recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in facilitating network requests, the method comprising:
   receiving, at a computing device associated with a transit service host, a request for a subscription plan from a communication device associated with a user, the subscription plan selected by the user and including a subscription fee payable by the user for the subscription plan;
   requesting, by the computing device, issuance of a transit account from an issuing entity independent of input from the user regarding the transit account, wherein the transit account is specific to the user for purchase of transit services, whereby, upon issuance of the transit account, a payment credential associated with the transit account is provisioned to a transit application implemented on the communication device associated with the user;
   in response to issuance of the transit account, receiving, by the computing device, the payment credential for the transit account from the issuing entity;
   storing, by the computing device, the payment credential for the transit account in a transit data structure in association with a profile for the user;
   compiling, by the computing device, in the profile for the user, rules for the transit account based on the subscription plan selected by the user, wherein the rules permit the transit service host to control the transit account consistent with the subscription plan;
   initiating a transaction for the subscription fee indicated by the subscription plan from a funding account associated with the user to a common account associated with the transit service host; and
   directing, by the computing device, funds from the common account to the transit account, at the issuing entity, based on the rules for the transit account, thereby permitting the user to engage in transit services funded by the transit account consistent with the subscription plan at multiple different transit providers.

2. The computer-implemented method of claim 1, wherein initiating the transaction further comprises initiating a recurring transaction for the subscription fee indicated by the subscription plan, from the funding account associated with the user to the common account, at an interval indicated by the rules for the transit account.

3. The computer-implemented method of claim 1, further comprising:
   determining, by the computing device, when a balance of the transit account is below a defined threshold; and
   directing, by the computing device, additional funds from the common account to the transit account, at the issuing entity, thereby permitting the user to engage in transit services consistent with the subscription plan and funded by the transit account.

4. The computer-implement method of claim 1, wherein the transit account includes a prepaid account.

5. The computer-implement method of claim 1, further comprising, for a transaction initiated by the user at a first transit provider using the transit account, determining, by the computing device, whether a merchant category code (MCC) associated with the first transit provider is associated with a permitted MCC for the transit account.

6. The computer-implemented method of claim 5, wherein the computing device is associated with a transit service host, and wherein the first transit provider does not have a direct contract with the transit service host;
   the method further comprising, when the MCC associated with the first transit provider is associated with a permitted MCC for the transit account, directing funds from the transit account to the first transit provider in connection with the transaction initiated by the user at the first transit provider.

7. The computer-implemented method of claim 6, further comprising:
   for a transaction initiated by the user at a second transit provider using the transit account, determining, by the computing device, whether a MCC associated with the second transit provider is associated with a permitted MCC for the transit account, the second transit provider having a direct contract with the transit service host; and when the MCC associated with the second transit provider is associated with a permitted MCC for the transit account, directing funds from the common account to the second transit provider in connection with the transaction initiated by the user at the second transit provider.

8. The computer-implemented method of claim 1, wherein directing funds from the common account to the transit account based on the subscription plan includes replenishing funds in the transit account using funds in the common account based on at least one rule determined free of any input from the user.

9. A system for use in facilitating requests by users for transit, the system comprising:

a transit data structure comprising profiles for multiple transit users, and multiple transit subscription plans available for selection by the users; and a service host in communication with the transit data structure, the service host configured to:

present one or more of the multiple transit subscription plans to a user at a communication device associated with the user and receive a selection from the user, via the communication device, of a transit subscription plan from the one or more of the multiple transit subscription plans;

request issuance of a transit pay account specific to the user for purchase of transit services from an issuer independent of input from the user regarding the transit pay account, whereby, upon issuance of the transit pay account, a payment credential associated with the transit pay account is provisioned to a transit application implemented on the communication device of the user;

in response to issuance of the transit pay account, receive the payment credential for the transit pay account from the issuer;

store the payment credential for the transit pay account in the transit data structure in association with a profile for the user;

compile, in the profile for the user, rules for the transit pay account based on the selected transit subscription plan, wherein the rules permit the service host to control the transit pay account consistent with the selected transit subscription plan; and direct funds from a common account to the transit pay account, at the issuer, based on the rules for the transit pay account, thereby permitting the user to engage in transit services funded by the transit pay account consistent with the selected transit subscription plan.

10. The system of claim 9, wherein the service host is further configured, for a transaction initiated by the user at a merchant using the transit pay account, to determine whether a merchant category code (MCC) associated with the merchant is associated with a permitted MCC for the transit pay account.

11. The system of claim 10, wherein the merchant does not have a direct contract with the service host; and wherein the service host is further configured, when the MCC associated with the merchant is associated with a permitted MCC for the transit pay account, to direct funds from the transit pay account to the merchant in connection with the transaction initiated by the user at the merchant.

12. The system of claim 11, wherein the service host is further configured, for a transaction initiated by the user at a second merchant using the transit pay account, to determine whether a MCC associated with the second merchant is associated with a permitted MCC for the transit pay account, the second merchant having a direct contract with the service host.

13. The system of claim 12, wherein the service host is further configured, when the MCC associated with the second merchant is associated with a permitted MCC for the transit pay account, directing funds from the common account to the merchant in connection with the transaction initiated by the user at the second merchant.

14. The system of claim 9, wherein the service host is further configured, in connection with directing funds from the common account to the transit pay account based on the rules for the transit pay account, to replenish funds in the transit pay account using funds in the common account based on at least one rule determined free of any input from the user.

15. The system of claim 14, wherein the service host is further configured to initiate a recurring transaction for an amount indicated by the selected transit subscription plan at an interval indicated by the rules for the transit pay account.

16. A non-transitory computer-readable storage media including executable instructions for use in facilitating requests by users for transit, which, when executed by at least one processor, cause the at least one processor to:

receive a request for a subscription plan for transit from a communication device of a user, the subscription plan selected by the user;

request issuance of a transit pay account specific to the user, for purchase of transit services, from an issuer and independent of input from the user regarding the transit pay account, whereby, upon issuance of the transit pay account, a payment credential associated with the transit pay account is provisioned to a transit application implemented on the communication device of the user;

in response to issuance of the transit pay account, receive the payment credential for the transit pay account from the issuer;

store the payment credential for the transit pay account in a transit data structure in association with a profile for the user;

compile, in the profile for the user, rules for the transit pay account based on the subscription plan, wherein the rules control use of the transit pay account consistent with the subscription plan selected by the user; and direct funds from a common account to the transit pay account, at the issuer, based on the rules for the transit pay account, thereby permitting the user to engage in transit services funded by the transit pay account consistent with the subscription plan.

17. The non-transitory computer-readable storage media of claim 16, wherein the executable instructions, when executed by the at least one processor, further cause the at least one processor to determine a replenishment schedule to replenish funds in the transit pay account using funds in the common account free of any input from the user.

18. The non-transitory computer-readable storage media of claim 17, wherein the executable instructions, when executed by the at least one processor, further cause the at least one processor to replenish funds in the transit pay account using funds in the common account based on the replenishment schedule.

* * * * *